3,300,337
ANTI-STATIC COATED TEXTILE FIBER
Robert S. Cooper, Park Forest, Ill., assignor to Stauffer Chemical Company, New York, N.Y., a corporation of Delaware
No Drawing. Original application Oct. 6, 1960, Ser. No. 60,788. Divided and this application Sept. 30, 1963, Ser. No. 312,326
11 Claims. (Cl. 117—139.5)

This application is a division of my copending application, Serial No. 60,788, filed October 6, 1960, now abandoned.

This invention relates to phosphonic acids which have been found to be useful anti-static agents.

In particular, this invention relates to the use of 2-carboxyalkyl alkylphosphonic acids and their alkali metal and amine salts as anti-static agents.

These compounds may be prepared by reacting a dialkyl phosphite with an ester of an unsaturated mono-, di-, or tricarboxylic acid; hydrolyzing all the ester radicals to the free acid and then selectively re-esterifying the carboxyl radicals to give the desired compound. These reactions may be illustrated by the following equations:

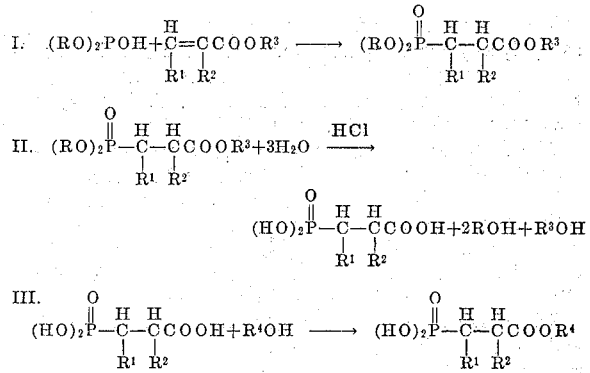

wherein R, $R^3$=lower alkyl; $R^1$=H, $CH_3$, $COOR^4$; $R^2$=H, $CH_3$, $CH_2COOR^4$; and $R^4$=alkyl.

It is well-known in the art to react dialkyl phosphites with unsaturated carboxylic acid esters as illustrated in Equation I. (See A. N. Pudovik, Zhur. Obschei. Khim., 22, 473–7, 1952.) It is also well-known to hydrolyze the resulting ester product to the corresponding acid as in Equation II. Thus, it can be readily seen that the exact alkyl groups which are identified by R, and $R^3$ are immaterial. These radicals are all lost during the hydrolysis. It is the nature of $R^4$ in the final compound, including its presence in the carboxylic groups of $R^1$ and $R^2$, which determines the unusual characteristics of these compounds.

The preferred unsaturated polycarboxylic acids which may be used in preparing these compounds include acrylic, methacrylic, crotonic, isocrotonic, maleic, fumaric, itaconic, and aconitic acids. Most of these acids are readily available commercially and ordinary commercial grades are satisfactory. As noted above, the particular phosphite used is unimportant since the ester radicals are converted to acid groups. Therefore, the readily available lower dialkyl phosphites such as methyl, ethyl, propyl, and butyl, are preferred. The ester groups which form the basis for these compounds include alkyl radicals containing from 1 to 18 carbon atoms. In particular, I find that the ester groups containing from 4 to 12 carbon atoms possess many valuable characteristics. I also find that reactions with dihydroxy alcohols such as ethylene glycol, propylene glycol, and the like, produce valuable compounds. These compounds are illustrated by the following equation:

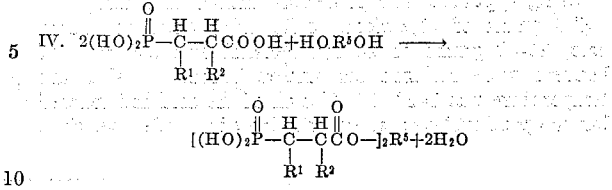

wherein $R^1$ and $R^2$ are as defined above and $R^5$ is a lower alkylene radical.

It is also within the scope of my invention to use these compounds in the form of their alkali metal, ammonium, or amine salts. These salts may be made by the conventional means using such representative bases as sodium and potassium hydroxide, ammonium hydroxide, mono-, di-, and trialkylamines, mono-, di-, and trialkanolamines, and the like. In particular, the lower alkyl, lower alkanol, octyl, lauryl, and stearyl amines produce substituted amine salts with valuable properties. As used herein, the term "substituted amino" is intended to include the radical resulting when an amine reacts with an acid. Therefore, representative radicals are diethyl amino [$(C_2H_5)_2N-$], diethanol amino

[$(HOC_2H_5)_2N-$]

and monobutyl amino [$(C_4H_9NH-)$].

The following examples illustrate the compounds useful in my invention:

*Example 1*

Forty-two grams of (2-carboxylic acid) propylphosphonic acid (prepared from dialkyl phosphate and methyl methacrylate followed by acid hydrolysis), 20.4 grams of n-butanol and 200 ml. benzene were placed in a flask fitted with a thermometer, water separator and reflux condenser. The mixture began to reflux at 80° C. and after twenty-three hours, 4.7 moles of water had been collected (theory, 4.5). The benzene and excess butanol were removed by stripping to 100° C. at 1 mm. Hg pressure. The product, a viscous liquid, weighed 52.1 grams (93.0%), and had an index of refraction $N_D{}^{25}$=1.4561. Neutralization equivalents run in alcohol showed the product to be dibasic. It analyzed 13.4% P, theory 13.8% P for

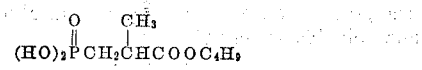

*Example 2*

In a manner similar to Example 1, 42.0 grams of (2-carboxylic acid) propylphosphonic acid, 32.6 grams of 2-ethyl hexanol and 200 ml. of benzene were placed in the flask and heated to reflux. After seventy hours of reflux, 4.8 moles of water had been collected. Volatiles were removed to 100° C. at 1 mm. leaving 64.9 grams (92.6%) of clear, straw colored product having an index of refraction $N_D{}^{25}$=1.4578. It was a dibasic acid and analyzed as 11.3% P, theory 11.1% P, for

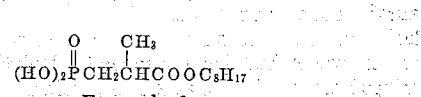

*Example 3*

Following the procedure of Example 1, 42.0 grams of (2-carboxylic acid) propylphosphonic acid, 7.8 grams of ethylene glycol and 200 ml. of benzene were placed in the flask and heated to reflux. The mixture refluxed at 100–105° C. and after 94.5 hours, 3.5 moles of water had been recovered. Volatiles were removed to 110° C. at 1 mm.

to give a viscous liquid analyzing 17.1% P, theory 17.1% P, for

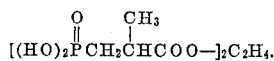

Example 4

Using apparatus and procedure similar to Example 1, 193.8 grams of (1,2-dicarboxylic acid) ethylphosphonic acid, 254.0 grams of 2-ethyl hexanol and 200 mls. of benzene were refluxed for sixteen hours. Final reflux temperature was 142° C. Not all of the acid had reacted but the product layer, after stripping of volatiles, weighed 282.8 grams. Analysis showed this product to be about 85%

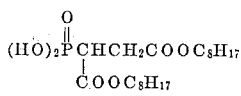

Twenty grams of this product was used to form the sodium salt

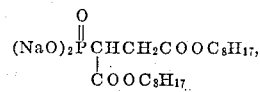

by neutralizing with NaOH to a pH of 6.5. This product was an excellent wetting agent as noted in Table II.

Example 5

The diethanolamine salt of 2-carboxyoctyl propylphosphonic acid was prepared by adding 15.8 grams of diethanolamine gradually to 28.1 grams of the phosphonic acid while stirring and cooling the beaker with ice water. The product was a viscous liquid, neutral to methyl orange and soluable in water.

Example 6

The diethanolamine salt of the product of Example 3 was prepared by reacting 18.2 grams of the ethylene glycol diester of (2-carboxylic acid) propylphosphonic acid with 15.8 grams of diethanolamine. The mixture was stirred with cooling during the addition to give a yellow almost solid salt which was neutral to methyl orange and soluble in water.

Example 7

Following the procedure of Example 1, 84.1 grams of (2-carboxylic acid) propylphosphonic acid, 11.8 grams of lauryl alcohol, and 200 cc. of toluene were placed in the flask and heated to reflux. After twenty-three hours, 12 ml. of water had been removed. Volatiles were then stripped off to 150° C. at 2 mm., yielding 183.1 grams of clear brown liquid (2-carboxylauryl) propylphosphonic acid. The sodium salt of this acid was prepared according to the procedure of Example 4, and this compound was found to be an excellent wetting agent, as noted in Table II.

The above compounds have been found to be excellent anti-static (AS) agents on various textile fibers. The following data indicate the reduction in static charge which takes place when the fibers are treated with these compounds. All data resulted from carefully controlled tests under the same conditions for each comparison of test sample and untreated blank. The test method briefly involved weighing a 10 gram wad of the fiber, scouring, drying, desiccating, saturating with a solution of anti-static agent, squeeze drying, weighing to obtain add-on, drying to remove solvent, cooling, conditioning in constant relative humidity (RH) atmosphere, rubbing briskly to develop charge, and measuring charge by dropping in a brass beaker with grounded voltmeter attached.

TABLE I

| Compound | Fiber | Conc./Solvent [1] | Percent AS on Fiber | RH Percent | Voltage [2] | Voltage of Untreated Blank [2] |
| --- | --- | --- | --- | --- | --- | --- |
| A | Cotton | 0.5%/EtOH | 1.2 | 79 | 45 | 117 |
| A | do | 0.5%/EtOH | 1.2 | 69 | 30 | 82 |
| A | Orlon | 1.2%/EtOH | 1.8 | 72 | 2 | 70 |
| A | Dacron | 1.2%/EtOH | 2.3 | 63 | 1 | 114 |
| A | Acetate | 1.0%/H$_2$O | 1.3 | 67 | 1 | 87 |
| A | Orlon | 1.0%/H$_2$O | 1.7 | 70 | 3 | 83 |
| A | Dacron | 1.0%/H$_2$O | 2.9 | 69 | 2 | 84 |
| A | do | 0.25%/H$_2$O | 0.5 | 50 | 29 | 131 |
| B | Cotton | 0.3%/CCl$_4$ | 1.6 | 53 | 27 | 121 |
| B | do | 0.3%/CCl$_4$ | 1.4 | 62 | 73 | 112 |

Compound A is the diethanolamine salt of (2-carboxybutyl) propylphosphonic acid.
Compound B is the diethanolamine salt of (2-carboxyoctyl) propylphosphonic acid.
[1] Concentration of anti-static agent, and solvent used.
[2] Average of 5 tests.

The Dacron referred to above is referred to hereinafter as "polyethylene terephthalate." It is the reaction product of dimethylterephthalate and ethylene glycol. (See Kirk-Othmer, Encyclopedia of Chemical Technology, Interscience 1953, vol. 13, at page 840 et seq.)

The Orlon referred to above is a polyacrylonitrile fiber. (See Kirk-Othmer, supra, vol. 13 at page 824 et seq.)

The acetate fiber referred to above was a commercial cellulose acetate which is representative of a class of similar compounds. These compounds have been carefully defined by the Federal Trade Commission. (See Kirk-Othmer, supra, vol. 11, at page 550 et seq.)

The above compounds were also tested as wetting agents and found to give excellent results. Table II shows the results obtained using the standard Draves test (Tech. Manual of the Am. Assn. of Textile Chemists and Colorists 35, 167 (1959) Std. Test Method 17—1952) to measure the sinking time at various concentrations.

TABLE II

| Surfactant | Concentration gms./liter | Draves Sinking Time (Average) sec. |
| --- | --- | --- |
| 2-carboxyoctyl propylphosphonic acid sodium salt | 4.0 | 0.0 |
|  | 2.0 | 0.2 |
|  | 1.0 | 0.6 |
|  | 0.5 | 15.8 |
|  | 0.25 | 74.1 |
| 2-carboxylauryl propylphosphonic acid sodium salt | 8.0 | 19.4 |
|  | 4.0 | 32.2 |
|  | 2.0 | 52.9 |
|  | 1.0 | 257.7 |
| 1,2-dicarboxyoctyl ethylphosphonic acid | 1.0 | 4.6 |
|  | 0.5 | 28.0 |
| Ultrawet K [1] | 4.0 | 0.0 |
|  | 2.0 | 1.8 |
|  | 1.0 | 4.4 |
|  | 0.5 | 13.3 |
|  | 0.25 | 49.1 |

[1] Ultrawet K is a synthetic anionic surface active detergent of the higher alkyl aromatic sulfonate type. It is included for purposes of comparison.

The foregoing description has been given for purposes of understanding only, and no unnecessary limitations should be derived therefrom.

I claim:
1. A static electricity resistant fiber comprising a fiber selected from the group consisting of cotton, cellulose acetate, polyethylene terephthalate, and acrylonitrile polymer having deposited upon the surface thereof from about 0.5% to about 3% by weight of a compound selected from the group consisting of (a) a compound of the formula:

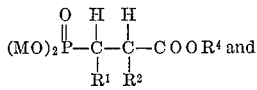

(b) a compound of the formula:

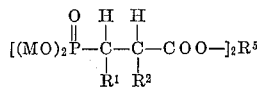

wherein $R^1$ is selected from the group consisting of H, $CH_3$, and $COOR^4$; $R^2$ is selected from the group consisting of H, $CH_3$, and $CH_2COOR^4$; $R^4$ is an alkyl radical containing from 1 to 18 carbon atoms; $R^5$ is a lower alkylene radical; and M is selected from the group consisting of hydrogen, alkali metal, ammonium, alkyl amine and alkanol amine.

2. A static electricity resistant fiber according to claim 1 wherein the fiber is cotton.

3. A static electricity resistant fiber according to claim 1 wherein the fiber is cellulose acetate.

4. A static electricity resistant fiber according to claim 1 wherein the fiber is polyethylene terephthalate.

5. A static electricity resistant fiber according to claim 1 wherein the fiber is acrylonitrile polymer.

6. A static electricity resistant fiber comprising a fiber selected from the group consisting of cotton, cellulose acetate, polyethylene terephthalate, and acrylonitrile polymer having deposited upon the surface thereof from about 0.5% to about 3% by weight of a compound of the formula:

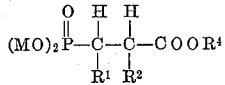

Wherein $R^1$ is selected from the group consisting of H, $CH_3$, and $COOR^4$; $R^2$ is selected from the group consisting of H, $CH_3$, and $CH_2COOR^4$; $R^4$ is a 4 to 12 carbon atom alkyl radical; and M is selected from the group consisting of hydrogen, alkali metal, ammonium, alkyl amine and alkanol amine.

7. A static electricity resistant cotton fiber comprising cotton having deposited upon the surface thereof, from about 0.5% to about 3% by weight of the diethanolamine salt of (2-carboxybutyl) propylphosphonic acid.

8. A static electricity resistant polyethylene terephthalate fiber comprising polyethylene terephthalate having deposited upon the surface thereof, from about 0.5% to about 3% by weight of the diethaneolamine salt of (2-carboxybutyl) propylphosphonic acid.

9. A static electricity resistant acrylonitrile polymer fiber comprising acrylonitrile polymer having deposited upon the surface thereof, from about 0.5% to about 3% by weight of the diethanolamine salt of (2-carboxybutyl) propylphosphonic acid.

10. A static electricity resistant acetate fiber comprising cellulose acetate having deposited upon the surface thereof, from about 0.5% to about 3% by weight of the diethanolamine salt of (2-carboxybutyl) propylphosphonic acid.

11. A static electricity resistant cotton fiber comprising cotton having deposited upon the surface thereof, from about 0.5% to about 3% by weight of the diethanolamine salt of (2-carboxyoctyl) propylphosphonic acid.

References Cited by the Examiner

UNITED STATES PATENTS 2,304,157  12/1942  Engelmann et al. ____ 260—500
2,963,458  12/1960  Swern _____ 260—30.6
2,971,019  2/1961   Ladd et al. _____ 260—946

FOREIGN PATENTS 1,038,692  9/1958  Germany.

OTHER REFERENCES

Nylen Berichte der Deutsche Chemischen Gersellschaft, 59, pp. 1119–1128 (1926).

MURRAY KATZ, *Primary Examiner.*

T. G. DAVIS, *Assistant Examiner.*